Oct. 20, 1959     K. H. ANDREN     2,908,910
WIRE CUTTING AND TERMINAL ATTACHING MACHINE
Filed Oct. 14, 1955     10 Sheets-Sheet 1

Fig. 1.

INVENTOR:
Karl H. Andren
by Lieber & Lieber
Attorney

Fig. 2.

INVENTOR:
Karl H. Andren
by Lieber & Lieber
Attorney

INVENTOR.

BY Karl H. Andren

Lieber & Lieber
Attorney

INVENTOR:
Karl H. Andren
by Lieber & Lieber
Attorney

Oct. 20, 1959 K. H. ANDREN 2,908,910
WIRE CUTTING AND TERMINAL ATTACHING MACHINE
Filed Oct. 14, 1955 10 Sheets-Sheet 7

INVENTOR:
Karl H. Andren
by Lieber & Lieber
Attorney

Oct. 20, 1959 K. H. ANDREN 2,908,910
WIRE CUTTING AND TERMINAL ATTACHING MACHINE
Filed Oct. 14, 1955 10 Sheets-Sheet 10

INVENTOR.
BY Karl H. Andren
by Lieber & Lieber
Attorney

United States Patent Office 2,908,910
Patented Oct. 20, 1959

2,908,910

WIRE CUTTING AND TERMINAL ATTACHING MACHINE

Karl H. Andren, West Allis, Wis., assignor to Artos Engineering Company, Milwaukee, Wis., a corporation of Wisconsin Application October 14, 1955, Serial No. 540,363

5 Claims. (Cl. 1—165)

This invention relates to improvements in the art of producing electrical conductors from wire stock, and relates more particularly to improvements in the construction and operation of machines for cutting insulated wire stock into predetermined lengths and for stripping insulation from at least one end of each severed section, and to mechanism cooperable with the cutting and stripping devices for applying terminals to the severed and/or stripped wire ends.

The primary object of the present invention is to provide a machine for rapidly and automatically producing successive electrical conductors of any desired length from longitudinally advancing wire stock, with utmost precision and dependability.

When producing successive electrical conductors from insulated wire stock which is fed longitudinally through a wire cutting and insulation stripping zone with the aid of a reciprocable wire clamp also adapted to effect the stripping operation and to deliver the leading end of the severed and stripped wire into a terminal attaching zone, it is of utmost importance that the location of the successive stripped wire ends within the terminal attaching zone be very exact, usually within a range of less than one sixty-fourth of an inch. With the rather heavy wire feed clamp traveling at high speed and through relatively long stroke, and because its travel is necessarily controlled and produced by several linkages for effecting variable stroke or travel range, it has heretofore been impossible with wire cutting and stripping mechanisms of this general type to obtain such precision of location of the severed leading wire ends relative to the terminal attacher. While the travel of the wire feeding clamp toward the terminal attaching dies may be accurately arrested with the aid of a normally fixed stop, the matter of stopping the reverse movement of this clamp in proper position when cutting of the wire and its insulation is to be effected, is more complex because the clamp at that moment is not at the extreme end of its return stroke and must be subsequently moved further in the same direction to effect stripping of the severed insulation. In order to cause the feed clamp to function properly so as to ultimately locate the stripped leading end of each successive severed wire length within the terminal attaching dies, it is necessary to accurately position the clamp when it picks up the wire stock before cutting is effected at which time it must be definitely positioned relative to the cutting blades. This accurate positioning of the stripped wire ends within the terminal attaching zone, both when producing conductors of lengths within the range of one stroke of the feed clamp, and when electrical conductors of greater length than that of a single clamp stroke are being produced, has heretofore been difficult because of the lack of proper wire guide mechanism directly in advance of the terminal attachers.

Heretofore it has been customary to leave the terminal attaching tools in wide open position after each terminal has been attached, but the wire guide associated therewith had to be tripped near the end of the open position of tools and returned by a spring to its wire guiding position, in order to properly guide the new wire end whenever it would approach. This prior wire guide thus blocked the advancement of the wire when the feed clamp was feeding several strokes, and since the clamp had to be approached close to the wire guide in order to properly guide a wire end without buckling, this resulted in a right angle bend in the wire for each intermediate feed. This was especially undesirable for stiffer wires, and it also effectively prevented proper collection and use of finished conductors.

It is therefore a more specific important object of this invention to provide a wire cutting, stripping and terminal attaching unit wherein a reciprocable wire feeding and insulation stripping clamp is automatically actuated to cooperate with the terminal attaching mechanism with utmost precision in order to properly locate the ends of the successive severed and end stripped wires relative to such mechanism.

Another important object of the invention is to provide improved mechanism for severing insulated wire stock into successive sections of any desired predetermined length and for effectively attaching terminals to ends of the severed lengths so as to produce substantially uniform final electrical conductors.

A further object of my invention is to provide an improved machine for producing electrical conductors from insulated wire stock, wherein the stock is advanced longitudinally past a cutting and stripping zone by a reciprocable clamp which also effects end stripping of each severed section of the wire, and in which the same clamp also feeds the wire stock through an improved guide and accurately positions the stripped end of each wire section with respect to a terminal attacher, regardless of the desired predetermined lengths of the sections and without undesirably bending and kinking the conductors.

Still another important object of the present invention is to provide a relatively simple but highly effective control system for the movement of a wire stock feeding clamp and for freely guiding the wire through a terminal attaching zone either during one stroke of the clamp as when producing short conductors, or when feeding several successive lengths through said zone as when producing longer conductors.

These and other more specific objects and advantages of the invention will be apparent from the following detailed description.

A clear conception of the several improved features constituting the present invention and of a typical commercial machine for producing electrical conductors in accordance therewith, may be had by referring to the drawings accompanying and forming a part of this specification, wherein like reference characters designate the same or similar parts in the various views.

While the invention has been illustrated and described herein as having been incorporated in an electrically controlled conductor producing unit some elements of which are actuated by fluid pressure, it is not intended to limit the use of the improvements to such an assemblage; and it is also contemplated that specific descriptive terms employed herein be given the broadest interpretation consistent with the actual disclosure.

Figure 1:
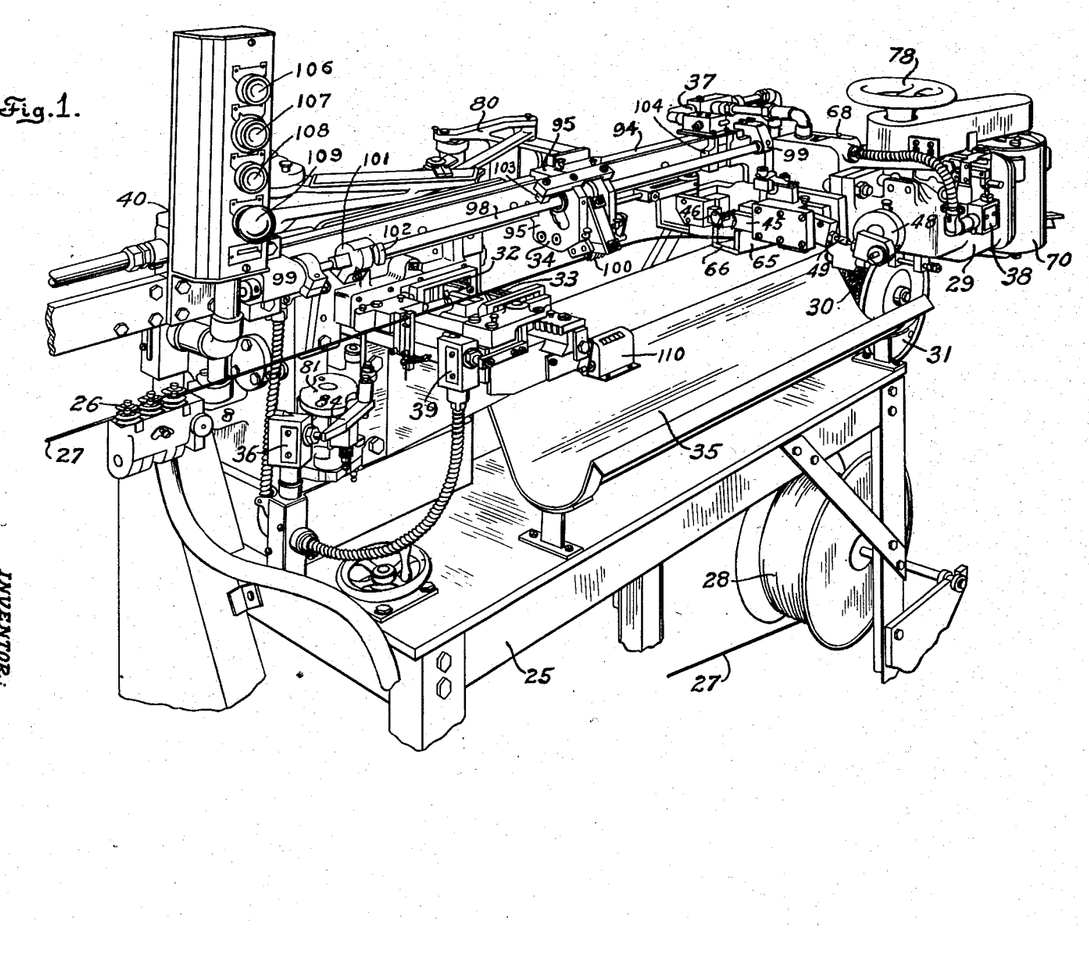
Fig. 1 is a perspective view of a complete machine for automatically producing successive conductors of any desired length from longitudinally advancing insulation covered wire stock.
Figure 3:
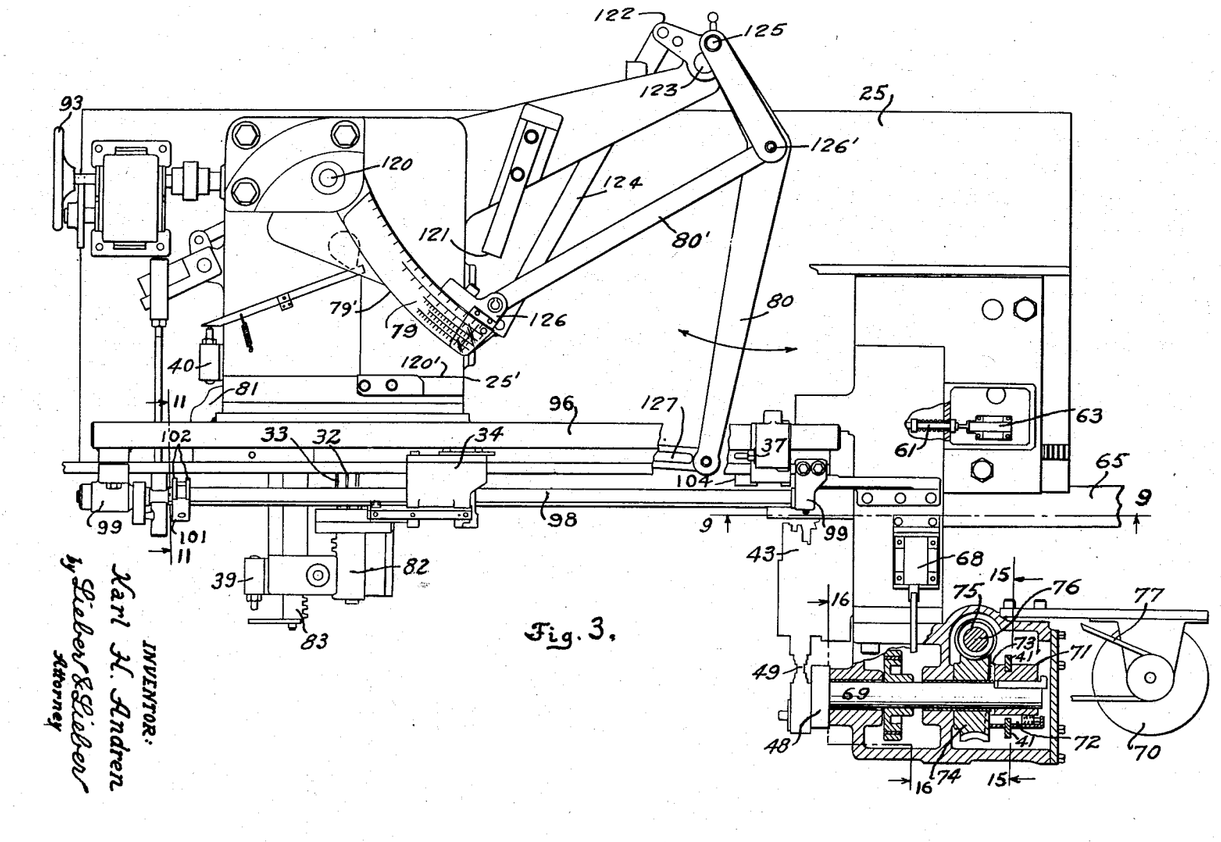
Fig. 3 is a part sectional top view of the same unit with portions broken away and omitted for the sake of clearness, the section having been taken horizontally and centrally through the drive for the terminal attaching tools.

Referring to Figs. 1 and 3 of the drawings, the improved electrical conductor producing unit shown comprises in general, a main frame 25 having a wire straightener 26 at one end for receiving insulation covered wire stock 27 from a supply reel 28 suspended beneath this frame; a wire cutting and stripping unit embodying a set of motor driven wire and insulation cutting knives 32, 33 housed within an auxiliary frame 25' which is fixedly attached to a medial portion of the main frame 25; a terminal attaching device 29 adjustable along the opposite end of the main frame 25 and which is adapted to receive strips of interconnected metal terminals 30 from a supply reel 31 suspended from the device; a wire stock feeding clamp 34 reciprocable upon a slide bar 94 carried by the frame 25 and along the square shaft or bar 98 from the outermost position of the device 29 past the knives and vice versa; a finished conductor receiving trough 35 carried by the frame 25 beneath the path of travel of the feed clamp 34; and a number of electric switches 36, 37, 38, 39, 40 for controlling the automatic functioning of the machine.

Figure 2:
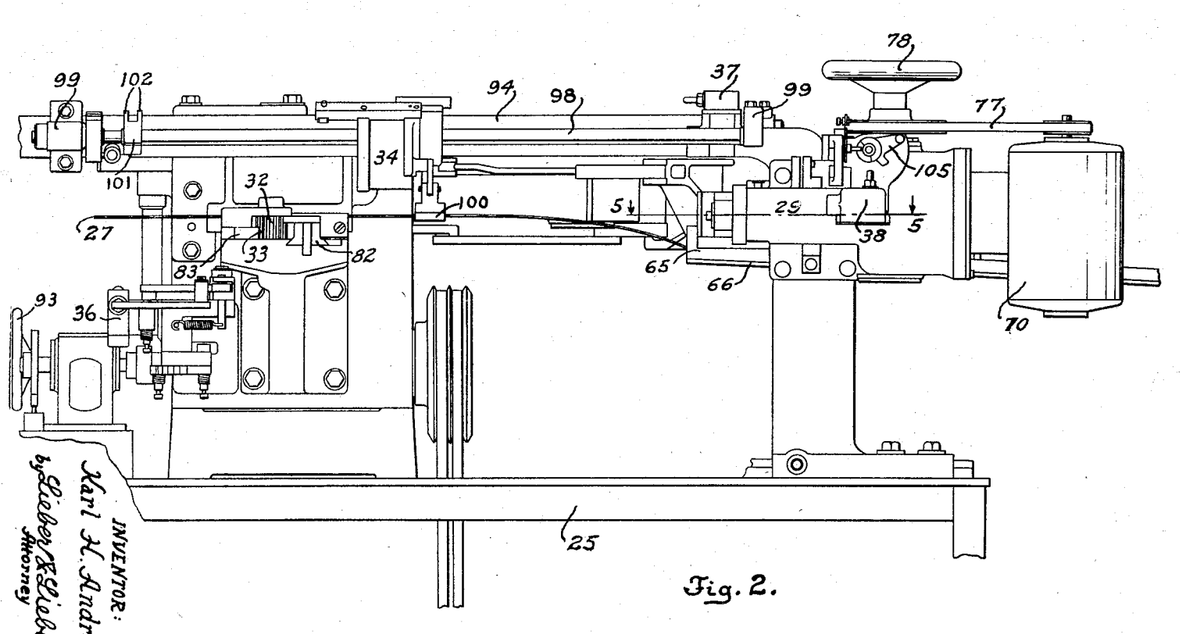
Fig. 2 is a front elevation of the same machine with some of the non-essential parts omitted for the sake of clearness.

The wire straightener 26 merely consists of a series of grooved rolls adapted to coact with the longitudinally advancing wire stock 27 so as to present the wire in straight condition to the cutting and stripping mechanism and to the terminal attaching device 29. As shown in Fig. 2, this device 29 is mounted upon a support which is carried by the frame 25 and is adapted to be locked in place by cap screws and the device consists primarily of a stationary reaction tool 42 and a relatively movable crimping tool 43 formed to wrap the ends of the successive terminals 30 snugly about the stripped ends 44 of the successive wire lengths while resting against the fixed tool 42; a pair of horizontally separable wire guiding plates 45, 46 movably attached to the tools 43, 42 respectively, and of which the plate 46 carries a wire holding slide 47; an eccentric 48 and a connecting rod 49 operable to reciprocate the movable tool 43; and a terminal strip feeding pawl 50 swingable into engagement with successive terminals 30 by a coil spring 51 and being reciprocable by a lever arm 52 secured to the lower end of an upright shaft 52' the upper end of which has a spring pressed arm 53' attached thereto which is oscillatable by a cam plate 53 carried by the reciprocable tool 43 so as to feed the successive terminals 30 into proper position for attachment to a wire end 44 whenever the tool 43 is being retracted from the crimping zone.

The normally stationary tool 42 is detachably secured to a casing 54 which also provides a guide for the wire guiding plate 46 and is mounted upon the terminal attaching device 29, and the reciprocable tool 43 is provided with a terminal strip shearing projection 55 for severing the successive terminals 30 from the supply strips, while each of the separable wire guiding plates 45, 46 has a semi-conical tapered socket 56 therein formed to conduct the stripped leading wire ends 44 centrally into the terminal attaching zone. The guide plate 45 which is movably attached to the movable crimping tool 43 is located in advance of and is resiliently urged in one direction by a spring 58 which reacts against a pin 59 carried by the tool 43 and which also serves to properly position the slide 45 relative to the adjacent tool 43.

Figure 5:
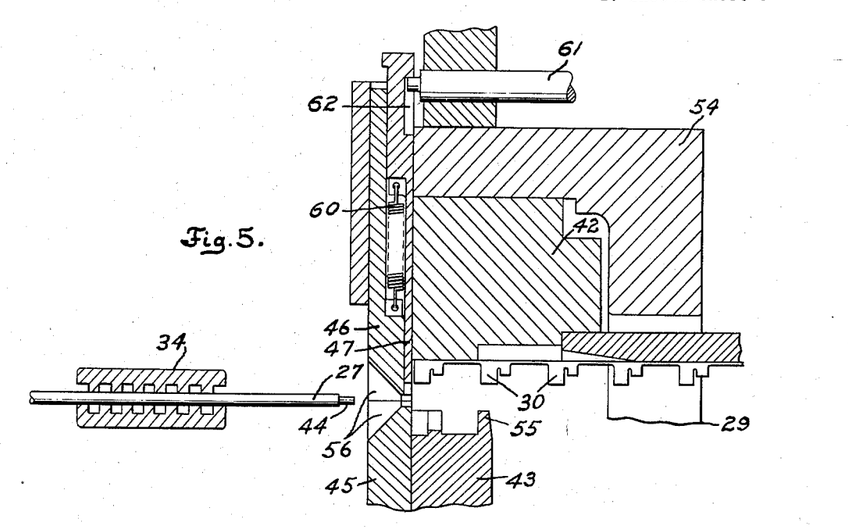
Fig. 5 is a further enlarged and fragmentary horizontal section through the terminal attaching zone and mechanism of the unit, taken along the line 5—5 of Fig. 2, and showing the wire holding or clamping plate released for unobstructed introduction of the leading stripped end of a wire into the terminal attaching zone.
Figure 6:
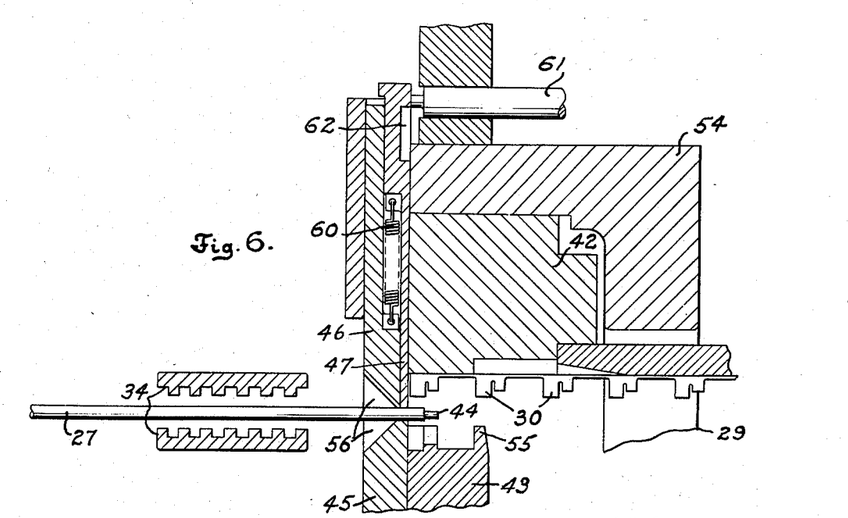
Fig. 6 is a section through the terminal attaching zone of the machine, similar to Fig. 5, but showing the stripped end of a wire held in proper position for receiving a terminal held in position but with the wire feeding clamp released and starting on its return stroke.
Figure 7:
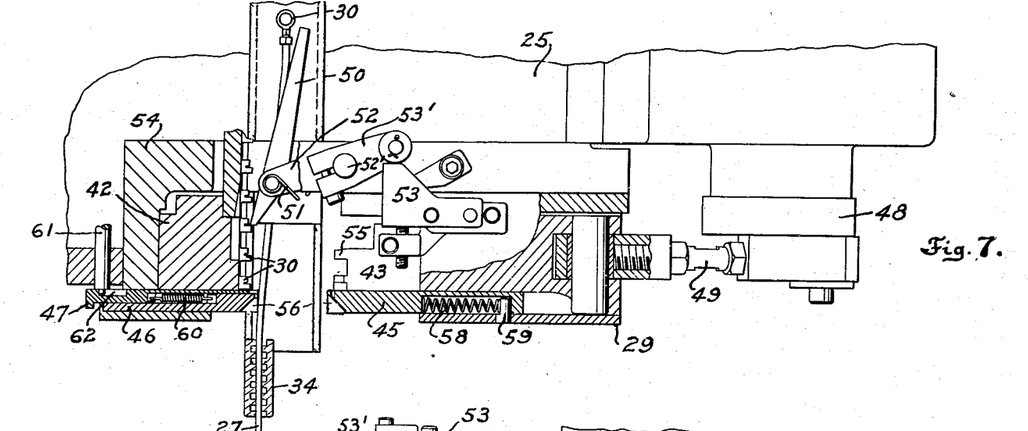
Fig. 7 is a somewhat reduced horizontal section through the terminal attaching zone of the machine, also taken along the plane of line 5—5 of Fig. 2, but showing more of the terminal feeding and attaching mechanism.
Figure 8:
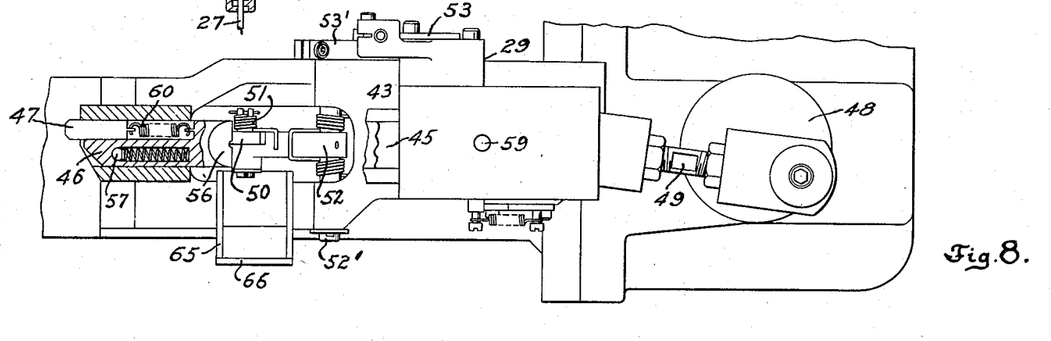
Fig. 8 is a part sectional front view of the terminal attaching mechanism of Fig. 7, the section having been taken vertically through one of the wire guides.

The wire guide plate 46 is likewise located in advance of the fixed tool 42, and is also resiliently urged in one direction by another spring which reacts against a pin 57 secured to the casing 54, and the slide 47 is constantly urged toward the guide plate 45 by a spring 60. The wire holding slide 47 is provided with a slot 62 which is engaged by a retractable pin 61 as in Figs. 5, 6 and 7, to prevent this slide from moving into wire gripping position when the guide plates 45, 46 are separated; but immediately after these plates have been brought together and a wire end 44 has entered the crimping zone, the pin 61 is withdrawn from the slot 62 by a solenoid 63 controlled by the switch 37 and shown in Fig. 3, thereby causing the slide 47 to cooperate with the plate 45 to firmly hold the inserted wire end 44 until after the tool 43 has sheared a terminal 30 from the strip and has crimped it to the wire end. Since the action of the solenoid 63 is only momentary, the spring coacting with the end of the pin 61 as Fig. 3, immediately causes this pin to enter the slot 62 in the slide 47 when this slide moves outwardly. When the guide plates 45, 46 with a wire 27 disposed and clamped therebetween by the slide 47, are being urged by the advancing tool 43 into final position of the wire 27 in the bottom of a terminal 30, the slide 47 is forced by the wire 27 backed up by the plate 45 past the position where the spring loaded pin 61 will again snap into the slot 62, and as the tool 43 and guide plates 45, 46 subsequently return or separate, the slide 47 will remain latched until the solenoid 63 is again energized.

Figure 9:
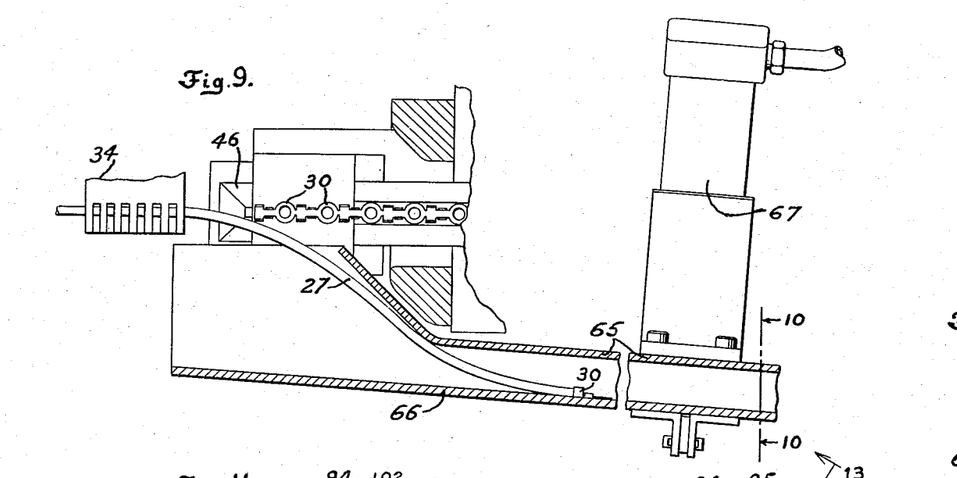
Fig. 9 is a fragmentary vertical section through the terminal attaching zone of the machine, taken along the line 9—9 of Fig. 3.
Figure 10:
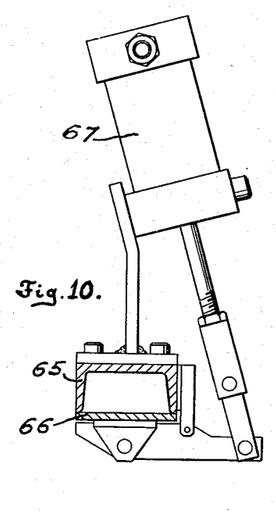
Fig. 10 is an end view of the mechanism shown in Fig. 9, taken along the line 10—10.

As illustrated in Figs. 9 and 10, an elongated conduit 65 having a releasable bottom shelf 66 which may be lowered by means of an air cylinder 67 or the like in timed relation to the knife opening, is located beneath the terminal attaching zone, and this conduit 65 is formed to conduct the finished electrical conductors 27 away from this zone regardless of the length of these conductors. The shelf 66 is adapted to be automatically lowered by the cylinder 67 or the like whenever a completed conductor 27 is deposited thereon, so as to drop the finished product into the receiving trough 35; and the operation of the terminal crimping tool 43 is accurately timed by another solenoid 68 shown in Fig. 3 which coacts with the horizontal shaft 69 for driving the tool actuating eccentric 48 through mechanism shown in Figs. 7, 14, 15, and 16, as follows.

Figure 16:
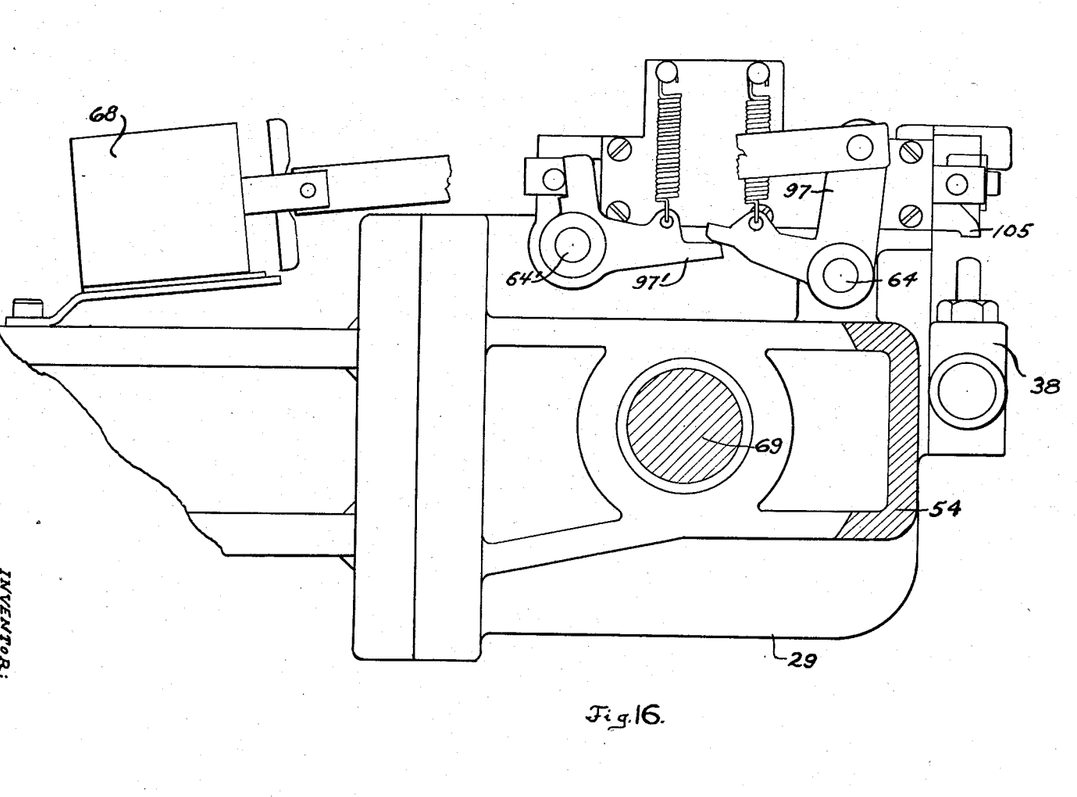
Fig. 16 is another part sectional end view of the actuating mechanism for the terminal attacher, the section being taken along the line 16—16 of Fig. 3.

An electric motor 70 is drivingly connected to the shaft 69 through a pin clutch 71 having an axially movable pin 72 adapted to be brought into driving engagement with radial teeth 73 on one side of a worm wheel 74 coacting with a worm 75 carried by an upright shaft 76 driven by the motor 70 through a belt drive 77, and the shaft 76 may also be rotated manually for trial run purposes by means of a hand wheel 78. The clutch 71 is keyed to the shaft 69 having a brake associated therewith and has an annular groove engaged by opposed throw-out arms 41, 41' shown in Fig. 15, which are swingably attached to shafts 64, 64' respectively, and these shafts also carry bell cranks 97, 97' of which the bell crank 97 has one arm directly attached to the shaft 64 which is connected to the solenoid 68 by a connecting rod as illustrated in Fig. 16. The other arm of the bell crank 97 coacts with an adjacent arm of the other bell crank 97' to oscillate the shaft 64' and the throwout arm 41' in a direction opposed to that of the arm 41, and the coacting arms of the two bell cranks 97, 97' are normally maintained in contact with each other by tension springs as in Fig. 16, and both of the attached throw-out arms 41, 41' are also, normally by the same spring action, held in contact with the bottom of the annular groove in clutch 71. When the machine is adjusted for making multiple length conductors, the presence of both throw-out arms 41 and 41' in the groove in the clutch 71 will force the shaft 69 to stop after approximately one-half turn and following each actuation of the clutch 71 by the solenoid 68. When the throw-out arm 41' is active the shaft 69 stops after the tool 43 is substantially wide open to allow the several strokes of wire 27 to feed between and past the open tool 43 and guide plates 45, 46. When the throw-out arm 41 is active the shaft 69 stops when the tool 43 has almost reached the end of its closing stroke as in Fig. 5, with the guide plate 45 in juxtaposition with the guide plate 46 and the socket therein ready to receive the leading end of another wire 27. After such a wire has been inserted as in Fig. 6 the solenoids 63 and 68 will have been energized to lock the wire with the slide 47 and to trip the clutch 71 to actuate the shaft 69 to complete the stroke of the tool 43, thereby transferring the wire 27 laterally with the guide plates 45, 46 and while clamped by slide 47, into the terminal 30, thereby crimping the same and severing it from the carrying strip and subsequently opening the tool slide 43 as in Fig. 7 when the shaft 69 will be stopped by throw-out arm 41'.

A lever 105 which is manually operable to change from long length conductor production as shown in Fig. 16, to short length production and vice versa, cooperates with the switch 38 and with the bell crank 97' to hold the arm 41' out of possible engagement with the clutch pin 72 and thus avoids release of the clutch by the lever 41'. The shaft 69 will then continue to function for a full revolution and this shaft will stop with the tool 43 and guide plate 45 in the position shown in Fig. 5, where the tool 43 and guide plates 45, 46 and the guide 47 are ready to receive the next wire 27. The device 29 may thus be set to produce either short length conductors within the range of travel of the wire feeding clamp 34, or long length conductors of greater length than the feed clamp travel range by merely manipulating the lever 105 which controls the clutch 71.

The wire feeding, cutting and stripping mechanism embodied in the auxiliary frame 25' may be one of several relatively well-known mechanisms, and consists primarily of a wire feeding and stripping clamp 34, intermittently reciprocating along a stationary slide bar 94 and along a rotatable square shaft 98, which operates a pair of clamp jaws 100 to raise same when releasing clamp 34 and to lower same when gripping and clamping wire stock 27, a set of reciprocable wire cutting and stripping knives 32, 33 and a timing cam 81, operated in timed relation from a vertical cam 85, driven from within the auxiliary frame 25' by a double V-belt drive below the frame 25, see Figs. 1, 2, 3 and 4. One revolution of the cam shaft 85 and with the timing cam 81 removed, covers one complete cycle for producing one complete conductor within the length range afforded by the machine, cut to length and with both ends stripped. With a cam 81, having a selected number of notches and which is indexed to turn a preselected fraction of a revolution for each revolution of the cam shaft 85, lengths up to twelve times a single cycle setting may be produced, as will be described.

The wire and insulation cutting knives 32, 33, which are housed within the stationary auxiliary frame 25' and are located upon the main frame 25 between the straightener 26 and the terminal crimping zone, are of relatively well-known construction being mechanically timed to periodically sever the wire stock 27 into selected predetermined lengths and to simultaneously cut through the wire and the insulation whenever the feed clamp 34 has fed the desired length of stock 27 with its end 44 properly positioned. The precise length of each conductor can be predetermined with the aid of an arcuate calibrated gauge 79 and oscillatory linkage cooperating therewith as illustrated in Fig. 3. The gauge 79 is mounted upon a curved lever 79' which is positively oscillatable by a shaft 120, and this lever is periodically swingable between fixed stops 120' and 121 mounted upon the auxiliary frame 25' and driven from within this auxiliary frame.

An oscillatory bell crank 122 pivoted on a shaft 123 carries a pin 125 and is swingable about the pivot shaft 123 from within the auxiliary frame 25' through a link 124 to impart intermittent oscillatory motion to the bell crank 122 and to thereby vary the position of the pin 125. A block 126 which is slidably adjustable along the arcuate lever 79' is connected by a link 80' to a pin 126' mounted upon a medial portion of a lever 80 one end of which is fulcrumed on the oscillatory pin 125 and the opposite end of which is attached to the wire feeding clamp 34 by a link 127. The block 126 is adjustable along the lever 79' to vary the stroke of the feed clamp 34 as produced by this calibrated lever, from its maximum as illustrated in the setting of Fig. 3, to lesser strokes as the block 126 is adjusted toward the shaft 120.

The oscillatory motion of the pin 125 carried by the bell crank 122 slightly shifts the fulcrum point of the lever 80 whenever a length of stock 27 has been advanced, thereby causing the lever 80 which is then pivoting about the pin 126' to give an additional right movement to the clamp 34 in a direction toward the device 29, thereby stripping the insulation from the trailing end of the wire 27 when short lengths are being produced. Whenever the stock feeding clamp 34 reaches the outer end of its stroke toward the device 29 as determined by the adjustment of the gauge block 126 along the lever 79', there is a slight dwell in the clamp actuating movement sufficient to permit the square shaft 98 to be rotated to actuate the jaws of the clamp 34, thereby raising the clamp fingers 100. When the clamp 34 returns to the left with the fingers 100 above the cutting zone there is again a dwell and the square shaft 98 then actuates the fingers 100 to descend and clamp the wire 27, whereupon the pin 125 will again actuate lever 80 to give a short stroke to the clamp 34, in a direction toward the straightener 26, and thereupon the lever 79' will again cause the clamp 34 to advance the wire 27. While the clamp 34 is feeding the intermediate strokes of multiple stroke wire feeds, these stripping strokes will merely advance and retract the wire short distances between feed strokes, but when the knives 32, 33 are actuated in timed relation by the intermittently indexing cam 81 and by the associated actuating mechanism consisting of lever 90, tooth 89, indentation 88 in the reciprocating arm 87, the knives 32 will cut the wire completely while the knives 33 will cut through the insulation only. At the end of the last feed stroke, the subsequent stripping stroke will cause the trailing end of the wire to be stripped, and the knife actuated switch 39 and the cam operated switch 40 as in Fig. 17 will actuate solenoid 68 to trip the clutch 71 to turn one-half turn to close guide plates 45, 46 for the next wire.

Figure 18:
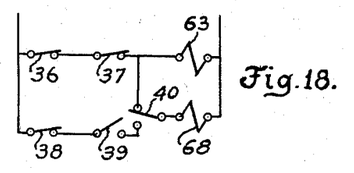
Figures 23, 24:
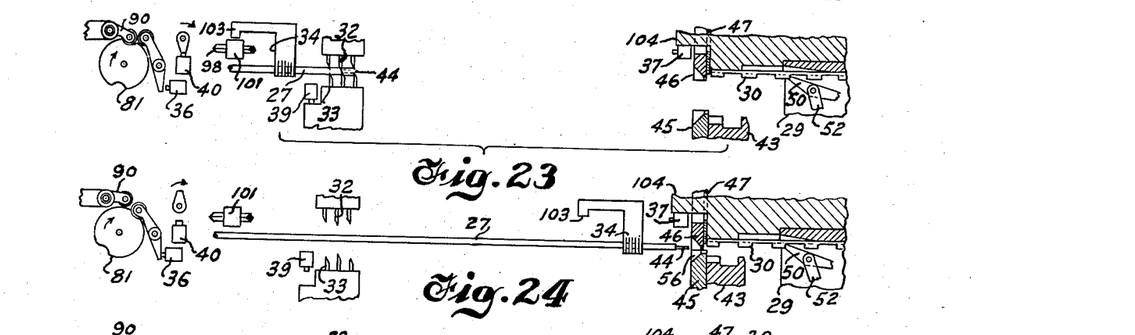
Figs. 23 to 29 inclusive are diagrams depicting the successive movements of the various parts of the mechanism while producing long length conductors, and especially the elements for actuating the various control switches.
Figure 25:
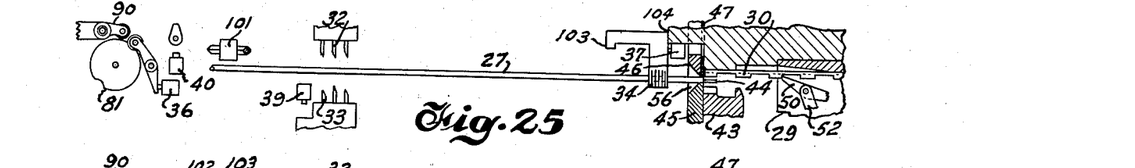

Upon return of the clamp the fingers 100 will descend and clamp the wire still held between the knives as in Fig. 23 and upon completion of the left stripping stroke towards the straightener 26 the knives 32, 33 will open wide to permit the clamp fingers 100 to travel through the cutting zone with a newly stripped wire end 44 thereby opening the switch 39, and the switch 40 will be shifted by an actuating cam shown in Fig. 3, and as the cam 81 indexes to prevent the knives 32, 33 from closing during the next cycle, switch 36 will close and the feeding stroke will advance clamp 34 to the position shown in Fig. 24. As the stripping stroke follows immediately the clamp 34 will insert the wire end 44 through the plates 45, 46 into the terminal attaching zone. When the clamp 34 reaches the end of its stroke it will activate the switch 37 to close the circuit as in Figs. 25 and 18, and will also be positively arrested against the stop 104. The switch 37 will thus energize both the solenoid 63 to release the clamp slide 47 and to clamp the wire while square shaft 98 opens and elevates fingers 100, and solenoid 68 will trip the clutch 71 to crimp the terminal and move the tool 43 to open position. This dwell action and actuation of the wire clamping jaws by the square shaft 98, are both well known, as shown and described in my prior patent hereinafter referred to in connection with the description of the clamp actuating mechanism.

The mechanism just described thus provides the clamp 34 with jaw actuating motion and with two separate reciprocating movements, one of which is variable in accordance with the adjustment of the block 126 along the arcuate lever 79' to vary the wire feeding stroke, and the other of which produces a short stripping stroke for the clamp 34 at the end of each stroke. However, for long length conductor production, the wire cutting and stripping action is eliminated for one or more strokes of the clamp 34, by utilizing replaceable cams 81 provided with one or more peripheral notches as shown in Figs. 1 and 4.

Figure 4:
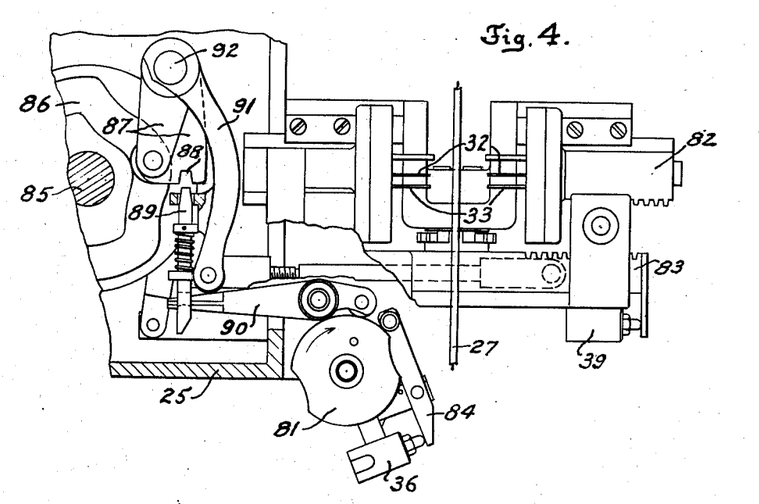
Fig. 4 is an enlarged fragmentary top view of the wire cutting and stripping zone and mechanism of the machine.

The blades 32, 33 on the opposite sides of the path of travel of the wire stock 27 are reversely reciprocable by means of gear connected racks 82, 83 and the timing of the operation of these blades is controlled by a lever 90 coacting with the indexing cam 81 shown in Fig. 4. The cam shaft 85 for actuating the blades 32, 33 may be propelled by an electric motor not shown, and carries a revolving cam 86 which coacts with an arm 87 swingable about a pivot 92 and having an indentation 88 therein adapted to be engaged by a tooth 89 movably mounted on a lever 91. The lever 91 is swingable about the pivot 92 independently of the arm 87 but the tooth so movable by the lever 90 into engagement with the indentation 88 by the timing cam 81. When the tooth 89 engages the indentation 88 while the shaft 85 and cam 86 are revolving, the knife blades 32, 33 will be actuated by the oscillation of the lever 91 the swinging end of which is connected to the rack 83 as shown in Fig. 4, but when the tooth 89 is withdrawn then the cutting blades 32, 33 will remain inactive. The drive shaft 85 may also be propelled manually for trial run purposes with the aid of a hand wheel 93 shown in Fig. 2.

Figure 11:
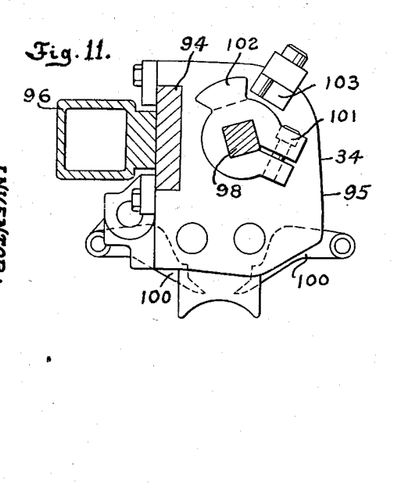
Fig. 11 is an enlarged part sectional end view of the wire feeding clamp and its supporting and actuating mechanism, the section having been taken along the line 11—11 of Fig. 3, and the clamping jaws being open.
Figure 12:
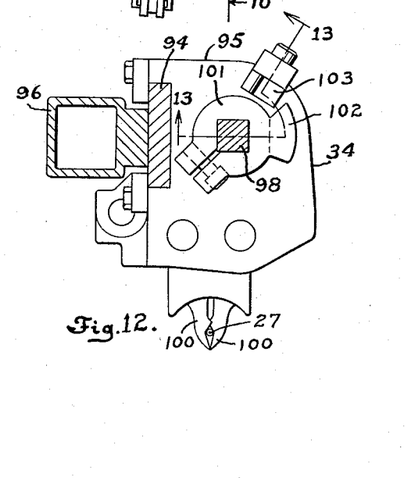
Fig. 12 is a similar view of the feed clamp but showing the wire gripping jaws closed.

The single feed clamp 34 for advancing the wire stock 27 longitudinally through the cutting and stripping zone is also of relatively well-known construction, but the system for controlling the movement of this clamp 34 relative to the terminal attaching mechanism in order to obtain successive final conductors of any desired uniform lengths, is important. As shown in Figs. 11 and 12, the clamp 34 has a body 95 which is gibbed to run on a slide bar 94 attached to a square supporting bar 96 secured to the frame 25'. The clamp 34 is reciprocable by the lever 80 and the link 127 along the slide bar 94 and the square shaft 98 the ends of which are journalled for oscillation about the rod axis in bearings 99, and the rod 98 extends through the clamp body 95 and is operatively connected to a pair of wire gripping jaws 100 pivotally suspended from the body 95.

The jaws 100 are operable by oscillation of the rod 98 in a well-known manner, so that when the rod 98 is positioned as in Fig. 11 these jaws are separated and retracted thereby permitting the clamp 34 to be moved without obstruction through the cutting and stripping zone even if the knife blades 32, 33 are in active position; but when the rod 98 is positioned as in Fig. 12 with the jaws 100 in clamping engagement with a wire 27 then the jaws can pass through the wire cutting and stripping zone only when the knives are separated. The specific construction of the mechanism for thus actuating the wire gripping jaws 100 by oscillating a polygonal clamp actuating shaft constitutes no part of the present invention, and is substantially shown and described in my prior Patent No. 2,680,394, granted June 8, 1954.

Figure 13:
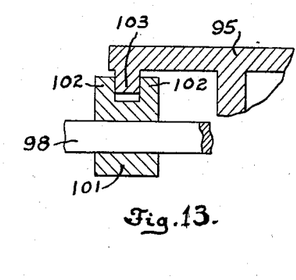
Fig. 13 is a section through the feed clamp locator, taken along the irregular line 13—13 of Fig. 12.
Figure 14:
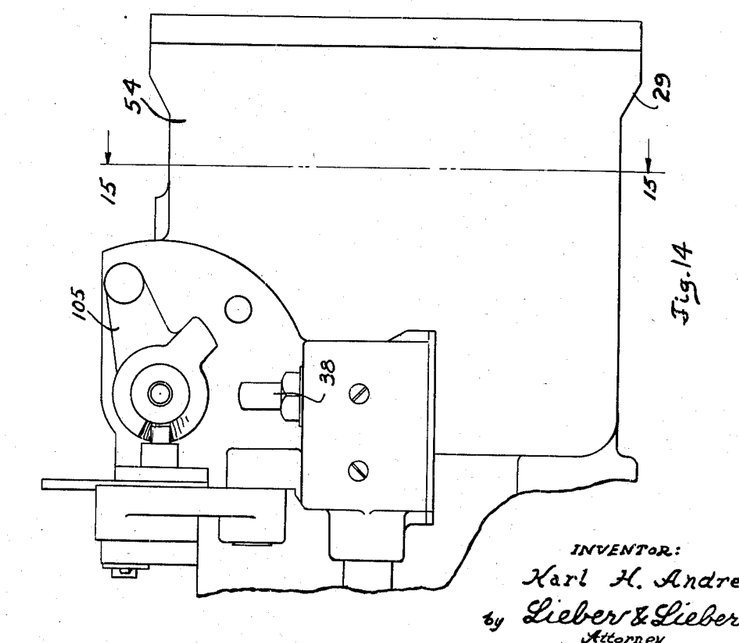
Fig. 14 is an enlarged front elevation of the actuator for the terminal attaching mechanism of the machine.
Figure 15:
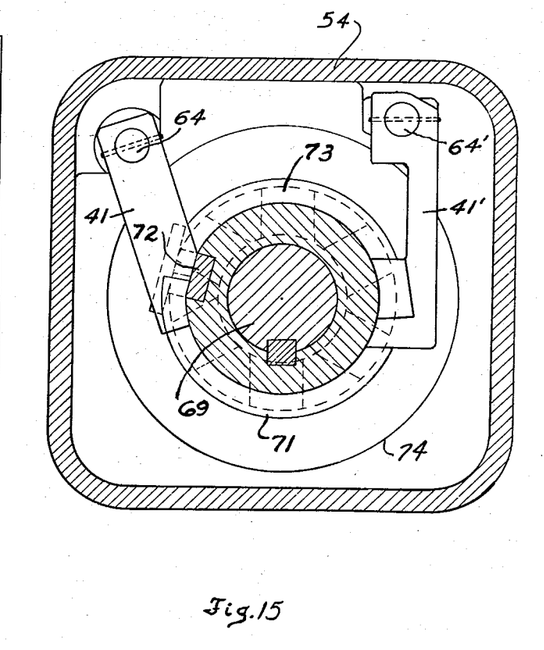
Fig. 15 is a similarly enlarged end view of the actuator mechanism shown in Fig. 14, a section having been taken vertically through its drive shaft along the line 15—15 of Fig. 3.

Mounted upon the square rod 98 and adapted to be positively attached thereto at the wire receiving end of the clamp stroke is a member 101 having outwardly projecting ears 102 as shown in Figs. 11, 12 and 13. These ears are adapted to engage a lug 103 formed on the clamp body 95, and when the rod 98 is oscillated to cause the ears 102 to coact with the lug 103 then the clamp 34 is positively located so as to permit the clamping jaws 100 to close and to grip the intervening wire 27 in proper relation to the cutting zone. The movement of the clamp 34 remote from the member 101 is always arrested by a stop 104 mounted upon the terminal attaching device 29 which is bodily adjustable along the main frame 25 in order to produce conductors of desired length.

The electrical system for controlling the automatic functioning of the unit is shown in the diagrams of Figs. 17 to 29 inclusive, which depict the several steps involved in the operation of the system, and the machine is provided with a switch panel containing control buttons for a stripping machine jogging or intermittent operating switch 106, a motor starting control switch 107, a terminal attachment motor starting control switch 108, and a stopping switch 109, this switch panel being mounted upon the main frame 25 as shown in Fig. 1. The unit is also provided with a counter 110 for registering the number of final conductors produced during each run, and when the reel 28 has been properly supplied with insulated wire stock 27 and the reel 31 has been likewise supplied with a strip of interconnected terminals 30, the wire 27 and the terminal strip may be initially positioned for starting with the aid of the hand wheels 78, 93 and switches 107, 108 after which automatic production of final conductors 27 such as shown in Fig. 9 is as follows:

The electrical control system shown in Figs. 17 to 22 inclusive insures accurate production of successive final conductors of uniform length regardless of whether this length is less or greater than the maximum stroke of the wire feed clamp 34. When producing conductors of greater length than the feed clamp stroke, the lever 105 must be set to maintain the switch 38 closed as in Figs. 14, 17 to 20, and the arm 41' shown in Fig. 15 will normally be in engagement with the clutch 71 whereby permitting this arm 41' to stop the shaft 69 with the tool 43 wide open and the wire guide plates 45, 46 separated to permit uninterrupted feeding of wire stock 27 of any desired length therebetween; but when the lever 105 is actuated to maintain the switch 38 open as in Figs. 21, 22, this lever also swings the bell crank 97' shown in Fig. 16 and rotates the shaft 64' so as to keep the arm 41' away from the clutch 71 whereby stopping the clutch shaft 69 only by the arm 41 once during each complete rotation of this shaft and with tool 43 in almost closed position and the guide plates 45, 46 closed to guide incoming wire as in Figs. 5 and 6, thus permitting each wire length to receive a terminal.

While the location of the cutting and stripping tools 32, 33 relative to the frame 25 is fixed, the terminal attaching device 29 may be bodily shifted along this frame toward or away from these tools to match the length of wire advanced, and the adjustable member 101 may be utilized when producing conductors of any length so as to accurately locate the feed clamp 34 relative to the knife blades 32, 33.

Figure 17:
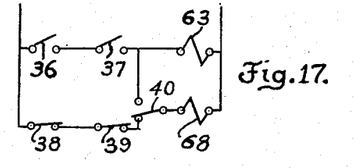
Figs. 17 to 22 inclusive are electrical diagrams showing the the control switches of the system in various operating positions.
Figure 26:
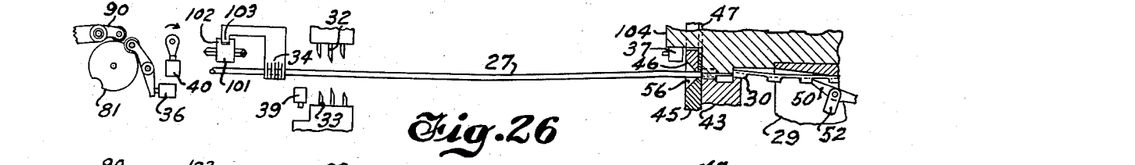

Referring to the diagrams, with the various parts positioned as in Figs. 17 and 23, one conductor of greater length than the stroke of the wire feed clamp 34 has just been produced, the square bar 98 has rotated to locate the clamp 34 and to clamp the fingers 100, the tool 43 is open and the leading end of the wire stock 27 is still held by the closed knives 32, 33 while the switch 39 is closed, and the solenoid 63 is de-energized and the spring pressed plunger 61 holds the blade 47. The switch 40 has just been cam actuated to energize the solenoid 68 and this solenoid then trips the pin clutch 71 and connects the shaft 69 with the rotating shaft 76 through the worm drive shown in Fig. 3, thereby starting the rotation of the shaft 69 for one-half revolution and thus advancing the tool 43 and the wire guide plates 45, 46. This one-half revolution of the shaft 69 will take place while the clamp 34 receives its stripping stroke from the rocking motion of the pivot 125, whereupon the knives 32, 33 connected to the cam 86 open and thereby open the switch 39, and the cam 81 subsequently rotates 1/12 turn thus disengaging the drive to knives 32, 33 and closing the switch 36. The clamp 34 then receives its feeding stroke from the lever 79' while the lever 80 pivots on the pin 125 and the cam simultaneously throws the switch 40. As the clamp 34 stops feeding, the stripped end 44 will be ready to enter through the now positioned plates 45, 46 and tool 43 shown in Figs. 5 and 24, and as the clamp 34 receives its stripping stroke forward from the pin 125, it will be positively arrested by the stop 104 and the wire end 44 will be definitely located between the tools 43 and 42 while the switch 37 is being momentarily closed by the clamp 34 as in Fig. 25, thereby resulting in a circuit as in Fig. 18 with both solenoids 63 and 68 energized. Solenoid 63 will then release the slide 47 so as to lock the wire 27, and the solenoid 68 will cause the clutch 71 to be again engaged for one-half turn to crimp the terminal, whereupon the shaft 69 will stop with tools in wide open position due to actuation of the arm 41'. Then while the clamp 34 has opened the fingers 100 by movement of the square shaft 98, the feed clamp 34 returns above the cutting zone under the action of the lever 79' thereby reopening the switch 37, and the shaft 98 will again cause the wire 27 to be engaged by the clamp after it has been positively located in relation to the cutting zone by the member 101. The switch 40 then has again been flipped and the terminal 30 has been attached to the leading end of wire 27 and has been severed from the terminal strip 30 as shown in Fig. 26. As the second cycle now progresses, the clamp 34 will again receive its stripping stroke to the left by action of pin 125 acting on the lever 80, but since the knives 32, 33 were disengaged by the action of the cam 81 during previous stock feeding, no cutting and stripping of the wire takes place and the wire 27 is merely retarded slightly and the finished terminated leading end is pulled away from the opening tool 43 and the plates 45, 46, while a new terminal 30 is being fed into the attaching zone as in Fig. 27.

Figure 19:
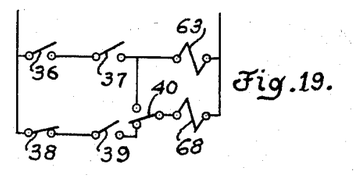
Figure 20:
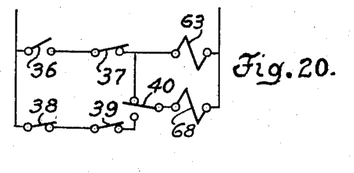
Figure 21:
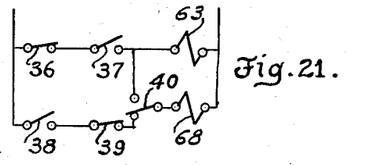
Figure 22:
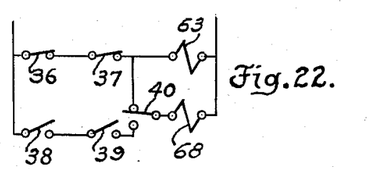
Figures 27, 28, 29:
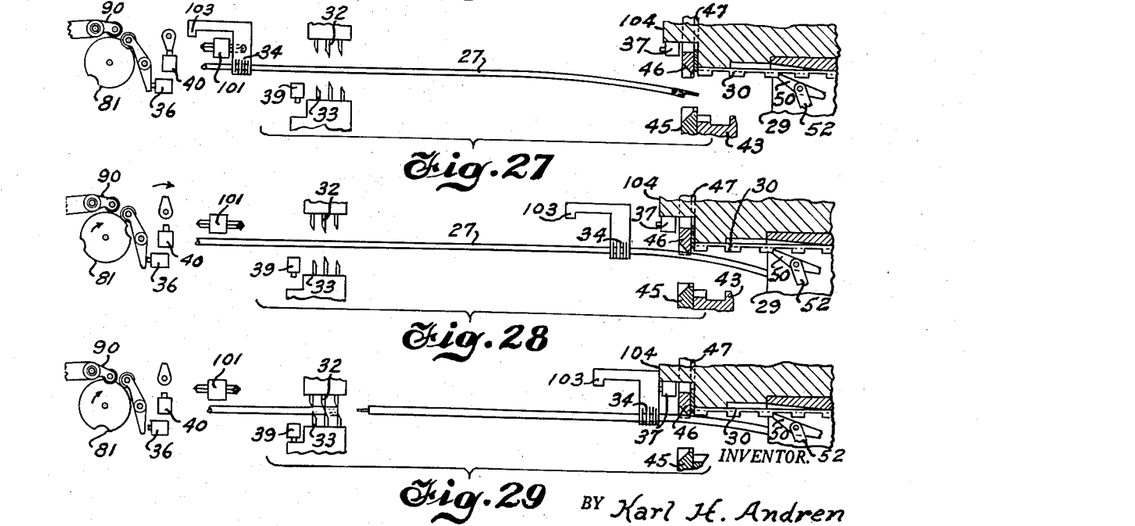

When the clamp 34 again feeds out wire 27 while the knives 32, 33, the plates 45, 46 and tool 43 are open, the cam 81 again indexes and disengages the switch 36 as in Fig. 19 and Fig. 28. As the cam 81 indexes once during each cycle and when no cam notch is approaching, the knives 32, 33 will stay separated and both the switch 39 and the switch 36 remain open, and the periodic shifting of the switch 40 and closing and opening of the switch 37 will have no effect upon the solenoids 63 and 68, see Fig. 19, so that the machine will keep on feeding out wire 27 a predetermined number of times past the open wire severing and terminal attaching zones. However, when a cam notch comes into a position for engagement with the roller on the lever 90, the spring pressed tooth 89 carried by lever 91 will enter the indentation 88 in the arm 87 just prior to its movement by cam 86 and will thereby operate the closing and subsequent opening of knives 32, 33. This knife closing also closes the switch 39, but since the periodically cam operated switch 40 has broken this portion of the circuit and the switch 36 will not close until next cycle, the solenoids 63, 68 will still remain de-energized as in Fig. 20, and when the clamp 34 receives its periodic stripping stroke as in Fig. 29 towards the device 29, the cut wire 27 will be stripped on the trailing end of the conductor 27, and since these solenoids have not been energized the finished conductor is free to fall from the conduit 65 when the shelf 66 has been removed by the air cylinder 67 operated from the tool actuating slide 83, and the square bar 98 has opened the clamp fingers 100.

When producing conductors of a length equal to only one feed clamp stroke or less, the lever 105 should be adjusted to off position, which, through the mechanism described will cause the arm 41' to stay out of engagement with the clutch 71 and will thereby maintain the switch 38 open. For such short conductor lengths the cam 81 is also removed and thus delivers no movements to levers 90 and 84, and therefore the spring pressed tooth 89 will stay in contact with the indentation 88 and will thereby transmit timed closing and opening movements to knives 32, 33 for each cycle of the machine, while switch 36 will remain closed. Then when the cam actuated switch 40 operates as before, no circuit can be established as in Fig. 21 while the leading end of the conductor is being stripped. When the knives 32, 33 open up and the clamp 34 feeds the required length through and past the cutting zone, the cam operated switch 40 shifts its contacts, and when the knives 32, 33 have again closed at the completion of the feed stroke, the clamp 34 receives its stripping stroke towards device 29 thereby inserting the leading wire end 44 through the closed plates 45, 46 and between the tool 43 and the terminal 30. Then as the clamp 34 reaches the end of the stripping stroke and is arrested by stop 104, the wire end 44 will be located in exact relation to the terminal 30 and the switch 37 will be momentarily actuated as in Fig. 22 to energize the solenoid 63 to release the clamp slide 47, and the solenoid 68 will trip the clutch 71 so as to make one revolution of shaft 69. This causes the tool 43 to crimp the terminal 30 and shear it from the terminal supply strip and to thereafter open up so as to drop the finished short conductor into trough 35 and to also stop again with plates 45, 46 in juxtaposition with the clamping slide 47 latched. In the meantime the clamp fingers 100 will open up and the clamp 34 returns above the closed knives in order to be again definitely positioned by the member 101, and the fingers 100 will subsequently clamp the wire 27 while it is held in knives 32, 33.

From the foregoing detailed description of the construction and operation of the machine it will be apparent that the present invention provides an apparatus and a system for manipulating the same whereby successive finished conductors each having a terminal attached to one end thereof may be produced with utmost precision as to uniformity of length and accuracy of terminal location, in a rapid and effective manner. Such production can be effected with finished conductors having any desired length either within the range of one stroke of the feed clamp 34, or in lengths greater than this range of travel of the clamp. One important feature of the invention is the proper positioning of the clamp 34 after its return stroke and before the wire is cut, since the stroke of this clamp is always positively arrested by the fixed stop 104. Another important feature is the unobstructed feed past the open guides which makes it possible to feed several strokes without kinking of wires and still close the guides 45, 46 to receive the next wire 27 before the wire enters and before actuating the tools 42, 43 to crimp a terminal 30 on the wire end 44. Still another important feature of the invention is the fixed location of the cutting and stripping zone, and the adjustability of this zone relative to the terminal attaching zone. The predetermining gage may be set to definitely determine the lengths of the conductors, and after this gage has been set and proper adjustments of the remaining mechanisms have been made, the apparatus functions to automatically produce the finished conductors in rapid succession and in any number as fixed by the counter. The improved machine has proven highly satisfactory and successful in actual commercial use and is adapted to handle insulated wire stock 27 of various gauges without having the finished product kinked or otherwise undesirably distorted.

It should be understood that it is not desired to limit this invention to the exact details of construction or to the precise mode of use of the apparatus herein shown and described, since various modifications within the scope of the appended claims may occur to persons skilled in the art.

I claim:

1. In combination, a source of wire stock, a terminal attaching device having separable wire directing guides spaced from said source, wire severing knives located between said source and said guides and being operable to cut successive wire lengths from the stock, a reciprocable wire gripping clamp movable past said knives to feed wire stock longitudinally with its leading end approaching said guides, means for closing said guides to cause the approaching leading end of the wire stock to be properly located within said device, means associated with said guides for holding each severed wire length in fixed position while a terminal is being attached to said leading wire end, and means for positively stopping said clamp upon its return movement away from said guides and during successive wire gripping operations thereof.

2. In combination, a source of wire stock, a device having terminal attaching tools and separable wire directing guides spaced from said source and formed to direct wire stock toward the device, wire severing knives located between said source and said guides and being operable to cut selected wire lengths from the stock, a reciprocable wire feeding clamp movable forwardly away from said source past said knives to feed wire stock longitudinally with its leading end approaching and threaded through said guides when closed, and means for separating said guides to effect unobstructed feeding of the wire stock past the guides and for subsequently closing the guides to again locate the next wire length in fixed position while a terminal is being attached to the leading wire end by said tools, said guide closing means being operable by said wire feeding clamp.

3. In combination, a source of wire stock, a device having terminal attaching tools and separable wire directing guides spaced from said source and formed to direct wire stock toward said device, wire severing knives located between said source and said guides and being operable to cut successive definite wire lengths from the stock, a reciprocable wire feeding clamp movable forwardly away from said source past said knives to feed wire stock longitudinally with its leading end approaching and threaded through said guides when closed, means for varying the number of feed strokes of said clamp before severing of a length of wire is effected by said knives, and means for closing said guides whenever a new leading wire length end approaches said device.

4. In combination, a source of wire stock, a terminal attaching device having guides provided with separable tapered wire directing sockets spaced from said source, wire severing knives located between said source and said guides and being operable to cut successive wire lengths from the stock, a wire feeding clamp movable past said knives to feed wire stock longitudinally with its leading end approaching said guides, means for moving said sockets toward each other to provide a funnel for guiding and causing the approaching leading end of the wire stock to be properly located within said device, and means associated with said guides for positively holding each severed wire length in fixed position while a terminal is being attached to its leading wire end by said device.

5. In combination, a source of wire stock, a terminal attaching device having guides provided with separable tapered wire directing sockets spaced from said source, wire severing knives located between said source and said guides and being operable to cut successive wire lengths from the stock, a wire feeding clamp movable past said knives to feed wire stock longitudinally with its leading end approaching said guides, means for moving said sockets toward each other to provide a funnel for guiding and causing the approaching leading end of the wire stock to be properly located within said device, means associated with said guides for positively holding each severed wire length in fixed position while a terminal is being attached to its leading wire end by said device, and means for separating said sockets to effect unobstructed feeding of the wire stock past said guides.

References Cited in the file of this patent

UNITED STATES PATENTS

| | | |
|---|---|---|
| 2,225,739 | Elliott | Dec. 24, 1940 |
| 2,340,448 | Andren | Feb. 1, 1944 |
| 2,688,133 | Berg | Sept. 7, 1954 |
| 2,694,809 | Berg | Nov. 23, 1954 |
| 2,727,236 | Klumpp | Dec. 20, 1955 |